No. 710,938. Patented Oct. 14, 1902.
W. C. BAKER.
VOLT METER SCALE.
(Application filed Feb. 15, 1902.)
(No Model.)
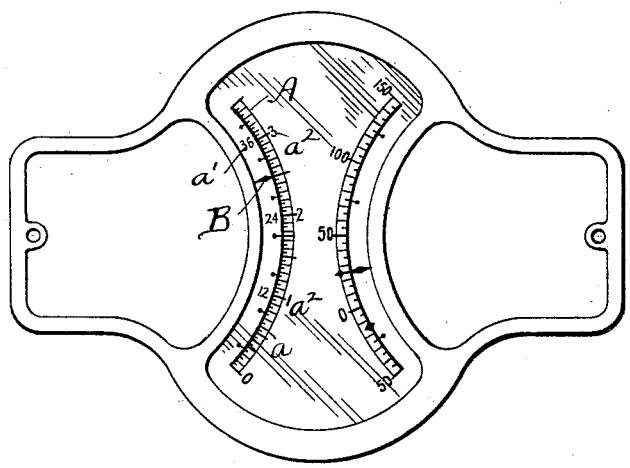
Witnesses.
E. B. Gilchrist
F. D. Ammen
Inventor.
Walter C. Baker
By his attys.
Thurston & Baker

UNITED STATES PATENT OFFICE.

WALTER C. BAKER, OF CLEVELAND, OHIO.

VOLTMETER-SCALE.

SPECIFICATION forming part of Letters Patent No. 710,938, dated October 14, 1902.

Application filed February 15, 1902. Serial No. 94,151. (No model.)

*To all whom it may concern:*

Be it known that I, WALTER C. BAKER, a citizen of the United States, residing at Cleveland, in the county of Cuyahoga and State of Ohio, have invented a certain new and useful Improvement in Voltmeter-Scales, of which the following is a full, clear, and exact description, reference being had to the accompanying drawing.

This invention relates to a voltmeter-scale especially adapted for use on electric vehicles, launches, and analogous machines for which the power is supplied by storage batteries. It is well-spread knowledge that such a battery is properly charged when each cell should show a voltage of 2.75 and that the voltage per cell ought not to be allowed to run below 1.75. The scales ordinarily used on voltmeters show the total voltage of all of the cells constituting a battery. It is of course not difficult to divide the voltage shown on such a scale by the number of cells in the battery and to thereby learn the voltage per cell, provided one knows how many cells there are in the battery. It is probably true that nearly all owners of electric vehicles and electric launches do know how many cells are in their batteries, although, considering the non-mechanical character of many people who own such machines, it is not unlikely that some may not be so well informed. At any rate, when a vehicle is taken to a charging plant the people who operate that plant may be wholly ignorant of the number of cells which the vehicle carries. So, also, in case a stranger is operating an electric carriage or launch he very likely will not know the number of cells it carries, and therefore cannot tell by the voltmeter how near his battery is to being run down.

The object of my invention is to provide a scale which will not only show the total voltage of the battery, but also the voltage per cell, so that no person need perform an arithmetical operation to obtain the voltage per cell and so that those persons who do not know the number of cells in the battery, whether they be charging the battery or running the machine, can tell from the reading of the voltmeter what the voltage per cell is at any time.

The scale embodying my invention consists of a scale graduated in accordance with the movement of the indicator-hand and having associated with the said graduations one set of figures which indicate the total voltage of the battery and a second set of figures each of which is the quotient obtained by dividing the associated figure in the first-named series of cells by the number of cells in the battery, which second set of figures represent, therefore, the voltage per cell.

The drawing is a view of a combined voltmeter and ammeter embodying my invention. The ammeter with its scale occupies the right-hand half of the instrument, which is a convenient arrangement. The ammeter, however, does not enter into the present invention and will not be described. The invention resides in the voltmeter-scale, which will now be more fully explained.

Referring to the parts by letters, A represents the scale, and $a$ the graduation-marks thereon. B indicates the movable point or hand. The voltmeter itself may be of any suitable construction. Associated with these graduation-marks $a$ are the figures $a'$, arranged at the left side of said marks, which figures indicate the total voltage of the battery. The figures $a^2$ at the right of said graduation-marks indicate the voltage per cell and each is the quotient obtained by dividing the associated figure in the first series by the number of cells in the battery.

The scale shown is for use with a battery having twelve cells; but the invention may be adapted for use with a battery having any number of cells.

Having described my invention, I claim—

A voltmeter-scale adapted for coöperation with the movable pointer of a voltmeter, and having thereon graduation-marks, and, associated with said marks, one set of figures indicating the total voltage of the battery, and a second set of figures which indicate the voltage per cell and are respectively the figures obtained by dividing the associated figures in the first series by the number of cells in the battery.

In testimony whereof I hereunto affix my signature in the presence of two witnesses.

WALTER C. BAKER.

Witnesses:
FRED R. WHITE,
SADIE TUCKER.